United States Patent
Kanjiyani et al.

(10) Patent No.: US 9,702,252 B2
(45) Date of Patent: Jul. 11, 2017

(54) TURBINE NOZZLES WITH SLIP JOINTS AND METHODS FOR THE PRODUCTION THEREOF

(71) Applicant: HONEYWELL INTERNATIONAL INC., Morristown, NJ (US)

(72) Inventors: Shezan Kanjiyani, Glendale, AZ (US); Natalie Wali, Chandler, AZ (US); Don Mittendorf, Mesa, AZ (US); Lorenzo Crosatti, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 1078 days.

(21) Appl. No.: 13/719,566

(22) Filed: Dec. 19, 2012

(65) Prior Publication Data

US 2014/0169957 A1    Jun. 19, 2014

(51) Int. Cl.
*F01D 9/04* (2006.01)
*F01D 1/04* (2006.01)
*B23P 11/00* (2006.01)

(52) U.S. Cl.
CPC ............... *F01D 1/04* (2013.01); *B23P 11/00* (2013.01); *F01D 9/041* (2013.01); *F01D 9/042* (2013.01);
(Continued)

(58) Field of Classification Search
CPC .......... F01D 9/041; F01D 9/042; F01D 9/044; F05D 2260/95; F05D 2230/60; F05D 2260/941
See application file for complete search history.

(56) References Cited

U.S. PATENT DOCUMENTS 2,605,997 A * 8/1952 Lombard ............... F01D 9/042
 415/138
2,654,566 A * 10/1953 Boyd ..................... F01D 9/042
 415/137

(Continued)

FOREIGN PATENT DOCUMENTS

| EP | 0277884 A2 | 8/1988 |
| EP | 2278125 A2 | 1/2011 |
| GB | 2177164 A | 1/1987 |

OTHER PUBLICATIONS

"Fusion Technology 1988" vol. 1, p. 806, published by Elsevier Science Publishers B.V., 1989 and edited by Van Ingen et al.*

(Continued)

*Primary Examiner* — Dwayne J White
*Assistant Examiner* — Kayla McCaffrey
(74) *Attorney, Agent, or Firm* — Lorenz & Kopf, LLP (57) ABSTRACT

Embodiments of a turbine nozzle are provided, as are embodiments of methods for the manufacture of turbine nozzles. In one embodiment, the turbine nozzle includes a support ring and a slip joint ring, which is substantially concentric with the support ring and radially spaced apart therefrom. The slip joint ring has a plurality of slots therein. A plurality of vanes is fixedly coupled to the support ring and extends radially therefrom into the plurality of slots. A plurality of radial slip joints is formed between the plurality of vanes and the plurality slots. Each slip joint extends around a different one of the plurality of vanes to permit relative radial movement between the plurality of vanes and the slip joint ring during operation of the turbine nozzle.

16 Claims, 6 Drawing Sheets

(52) U.S. Cl.
CPC .... *F05D 2230/60* (2013.01); *F05D 2260/941* (2013.01); *Y02T 50/671* (2013.01); *Y10T 29/49245* (2015.01)

(56) References Cited

U.S. PATENT DOCUMENTS

| | | | | |
|---|---|---|---|---|
| 2,914,300 | A * | 11/1959 | Sayre | F01D 9/042 415/135 |
| 2,937,000 | A * | 5/1960 | Ledwith | F01D 9/042 415/137 |
| 4,378,961 | A * | 4/1983 | Trousdell | F01D 9/042 415/137 |
| 4,529,452 | A * | 7/1985 | Walker | B21J 1/00 148/527 |
| 5,174,715 | A * | 12/1992 | Martin | B23P 15/006 29/464 |
| 5,224,825 | A * | 7/1993 | Strang | F01D 25/246 415/135 |
| 5,248,240 | A | 9/1993 | Correia | |
| 5,332,360 | A | 7/1994 | Correia et al. | |
| 5,630,700 | A * | 5/1997 | Olsen | F01D 5/189 415/134 |
| 5,634,767 | A | 6/1997 | Dawson | |
| 5,634,768 | A * | 6/1997 | Shaffer | F01D 9/042 415/137 |
| 5,743,711 | A * | 4/1998 | Fournier | F01D 5/3015 415/209.2 |
| 5,797,725 | A | 8/1998 | Rhodes | |
| 7,946,811 | B2 | 5/2011 | Abgrall et al. | |
| 8,020,269 | B2 | 9/2011 | Beverley et al. | |
| 8,047,771 | B2 | 11/2011 | Tucker et al. | |
| 8,070,429 | B2 | 12/2011 | Burdgick et al. | |
| 8,459,944 | B2 * | 6/2013 | Hamana | F01D 9/041 415/210.1 |
| 2007/0141368 | A1 | 6/2007 | Farmer et al. | |
| 2007/0163114 | A1 | 7/2007 | Johnson | |
| 2008/0141531 | A1 | 6/2008 | Paulino et al. | |
| 2009/0178775 | A1 | 7/2009 | Bewlay et al. | |
| 2009/0274562 | A1 | 11/2009 | Minor et al. | |
| 2010/0124492 | A1 | 5/2010 | Tucker et al. | |
| 2012/0003086 | A1 | 1/2012 | Morris et al. | |

OTHER PUBLICATIONS

EP Examination Report for Application No. 13193392.1-1610 dated Oct. 20, 2015.
EP Search Report for Application No. 13193392.1-1610/2746539 dated Sep. 28, 2015.

* cited by examiner

TURBINE NOZZLES WITH SLIP JOINTS AND METHODS FOR THE PRODUCTION THEREOF

TECHNICAL FIELD

The following disclosure relates generally to gas turbine engines and, more particularly, to embodiments of turbine nozzles having slip joints, as well as to methods for the manufacture of turbine nozzles having slip joints.

BACKGROUND

During operation, a gas turbine engine compresses intake air, mixes the compressed air with fuel, and ignites the fuel-air mixture to produce combustive gasses, which are then expanded through a number of air turbines to drive rotation of the turbine rotors and produce power. Turbine nozzles are commonly positioned upstream of the turbine rotors to meter combustive gas flow, while also accelerating and turning the gas flow toward the rotor blades. A turbine nozzle typically assumes the form of a generally annular structure having a number of flow passages extending axially and tangentially therethrough. By common design, the turbine nozzle includes an inner ring (also commonly referred to as an "inner endwall" or "inner shroud"), which is generally annular in shape and which is circumscribed by an outer ring (commonly referred to as "outer endwall" or "outer shroud"). A series of circumferentially-spaced airfoils or vanes extends between the inner and outer rings. Each pair of adjacent turbine nozzle vanes cooperates with the inner and outer rings to define a different combustive gas flow path through the turbine nozzle. Flanges are provided around the inner and outer rings to permit attachment of the turbine nozzle to the static engine infrastructure utilizing, for example, bolts or other fasteners.

Turbine nozzles have traditionally been produced as relatively large, unitary castings. More recently, turbine nozzles are often assembled from multiple, separately-cast pieces with each cast piece including an arched segment of the inner ring, an arched segment of the outer ring, and a number of vanes (e.g., one to five vanes) extending between the inner and outer ring segments (commonly referred to as a "segmented turbine nozzle"). In either case, the turbine nozzle vanes are typically fixed between the attachment points of the turbine nozzle (e.g., flanges extending radially from the inner and outer rings); and little, if any, radial compliancy is provided between the vanes and the locations at which the turbine nozzle is affixed to the engine infrastructure. For this reason, conventionally-produced turbine nozzles are typically unable to accommodate disparities in thermal growth between the turbine nozzle vanes and the other portions of the turbine nozzle occurring during engine operation as the vanes are bathed in combustive gas flow and significant thermal gradients develop across the body of the turbine nozzle. High stress concentrations may thus occur at the interfaces between the turbine nozzle vanes and rings, which can result in undesirably rapid thermomechanical fatigue and a reduced operational lifespan of the turbine nozzle.

It has recently been recognized that thermomechanical fatigue can be greatly reduced by imparting a turbine nozzle with slip joints, which permit relative radial movement between the turbine nozzle vanes and one or more of the turbine nozzle attachment points. U.S. Pat. No. 8,047,771 B2, entitled "TURBINE NOZZLES AND METHODS OF MANUFACTURING THE SAME," issued Nov. 1, 2011, and assigned to the assignee of the present application, describes turbine nozzles having cast annular bodies to which separately-produced flanges are joined. A slip joint is created between the cast annular body and at least one of the annular flanges to permit relative radial movement between the turbine nozzle vanes and at least one of the locations at which the turbine nozzle is mounted to the static engine infrastructure, which reduces thermomechanical fatigue of the turbine nozzle over its operational lifespan. This advantage notwithstanding, turbine nozzles having slip joints of this type remain limited in certain respects. For example, the slip joint design of such turbine nozzles can place undesired constraints on airfoil or vane geometry. Furthermore, as the turbine nozzle vanes and rings are produced as a single cast body, feature complexity within casting (e.g., the complexity of vane cooling flow passages) can be limited, scrap quantities can be relatively high due to voiding or other defects occurring within the larger castings, and the usage of single crystal superalloys in the fabrication of the vanes may be precluded.

It is thus be desirable to provide embodiments of a method for fabricating turbine nozzles including slip joints, which overcome most, if not all, of the above-noted drawbacks. It would also be desirable to provide embodiments of a turbine nozzle produced in accordance with such a fabrication method. Other desirable features and characteristics of the present invention will become apparent from the subsequent Detailed Description and the appended Claims, taken in conjunction with the accompanying Drawings and the foregoing Background.

BRIEF SUMMARY

Embodiments of a turbine nozzle are provided. In one embodiment, the turbine nozzle includes a support ring and a slip joint ring, which is substantially concentric with the support ring and radially spaced apart therefrom. The slip joint ring has a plurality of slots therein. A plurality of vanes is fixedly coupled to the support ring and extends radially therefrom into the plurality of slots. A plurality of radial slip joints is formed between the plurality of vanes and the plurality slots. Each slip joint extends around a different one of the plurality of vanes to permit relative radial movement between the plurality of vanes and the slip joint ring during operation of the turbine nozzle.

Embodiments of a method for producing a turbine nozzle are further provided. In one embodiment, the method includes the steps of obtaining a plurality of vanes, affixing the plurality of vanes around the circumference of a support ring, and inserting each of the plurality of vanes into a slot provided in a slip joint ring to form a plurality of radial slip joints. The slip joints each extend around a different one of the plurality of vanes to permit relative radial movement between the plurality of vanes and the slip joint ring during operation of the turbine nozzle.

BRIEF DESCRIPTION OF THE DRAWINGS

At least one example of the present invention will hereinafter be described in conjunction with the following figures, wherein like numerals denote like elements, and.

For simplicity and clarity of illustration, the drawing figures illustrate the general manner of construction, and descriptions and details of well-known features and techniques may be omitted to avoid unnecessarily obscuring the invention. Additionally, elements in the drawings figures are not necessarily drawn to scale. For example, the dimensions of some of the elements or regions in the figures may be exaggerated relative to other elements or regions to help improve understanding of embodiments of the invention.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description. Terms such as "comprise," "include," "have," and variations thereof are utilized herein to denote non-exclusive inclusions. Such terms may thus be utilized in describing processes, articles, apparatuses, and the like that include one or more named steps or elements, but may further include additional unnamed steps or elements. The term "radial slip joint," the term "slip joint," and similar terms and phrases are utilized to denote an interface created between two closely positioned surfaces that allows relative radial movement therebetween. The closely positioned surfaces may be separated by an air gap or, instead, intervening structural elements and/or materials (e.g., sealing materials of the type described below) may be disposed between the neighboring surfaces.

Figure 1:
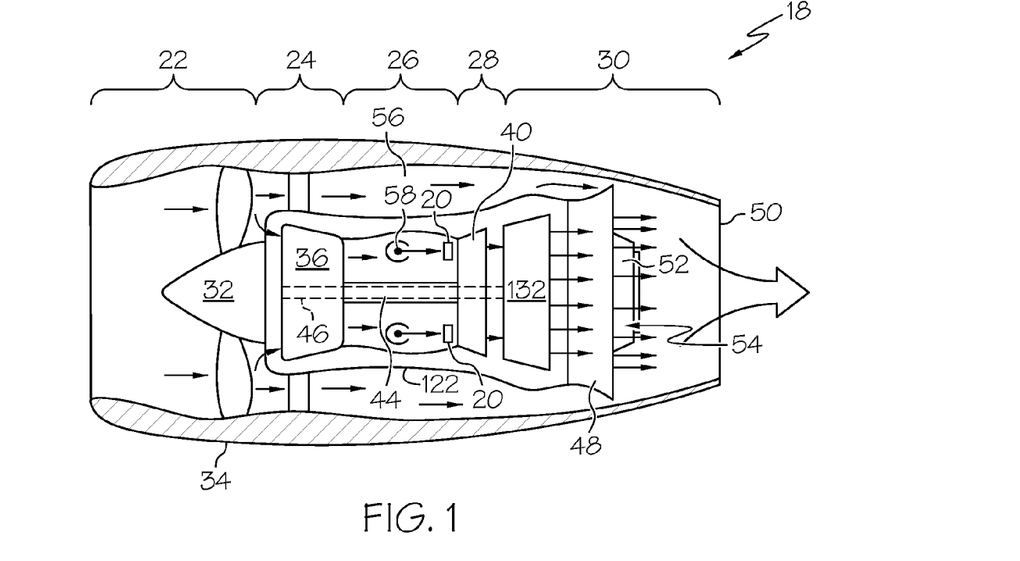
FIG. 1 is a simplified cross-sectional view of an exemplary gas turbine engine including a turbine nozzle, which can be produced in accordance with an embodiment of the fabrication process described herein.

FIG. 1 is a simplified cross-sectional view of an exemplary gas turbine engine (GTE) 18 including a turbine nozzle 20, which may be produced in accordance with the fabrication process described in detail below in conjunction with FIGS. 3-12. By way example, GTE 18 is illustrated in FIG. 1 as a two spool turbofan engine including an intake section 22, a compressor section 24, a combustion section 26, a turbine section 28, and an exhaust section 30. Intake section 22 includes an intake fan 32 mounted in a nacelle assembly 34. In the illustrated example, compressor section 24 includes a single axial compressor 36, which is rotatably disposed within an engine case 38 mounted within nacelle assembly 34. Turbine section 28 includes a high pressure (HP) turbine 40 and a low pressure (LP) turbine 42, which are rotatably disposed within engine case 38 in flow series. Turbine nozzle 20 is disposed downstream of combustion section 26 and immediately upstream of HP turbine 40. Although not shown in FIG. 1, a second turbine nozzle may likewise be disposed upstream of LP turbine 42. Compressor 36 and HP turbine 40 are mounted to opposing ends of an HP shaft 44, and intake fan 32 and LP turbine 42 are mounted to opposing ends of a LP shaft 46. LP shaft 46 and HP shaft 44 are co-axial; that is, LP shaft 46 extends through a longitudinal channel provided through HP shaft 44. Engine case 38 and nacelle assembly 34 terminate in a mixer nozzle 48 and a propulsion nozzle 50, respectively. Mixer nozzle 48 cooperates with a centerbody 52 to form an exhaust mixer 54, which mixes hot combustive gas flow received from turbine section 28 with cooler bypass airflow during operation of GTE 18.

As illustrated in FIG. 1 and described herein, GTE 18 is offered by way of non-limiting example only. It will be readily appreciated that turbine nozzles of the type described herein can be utilized within various other types of gas turbine engine including, but not limited to, other types of turbofan, turboprop, turboshaft, and turbojet engines, whether deployed onboard an aircraft, watercraft, or ground vehicle (e.g., a tank), included within an auxiliary power unit, included within industrial power generators, or utilized within another platform or application. With respect to exemplary GTE 18, in particular, it is noted that the particular structure of GTE 18 will inevitably vary amongst different embodiments. For example, in certain embodiments, GTE 18 may include an exposed intake fan (referred to as an "open rotor configuration") or may not include an intake fan. In other embodiments, GTE 18 may employ centrifugal compressors or impellers in addition to or in lieu of axial compressors. In still further embodiments, GTE 18 may include a single shaft or three or more shafts along with varying numbers of compressors and turbines.

During operation of GTE 18, air is drawn into intake section 22 and accelerated by intake fan 32. A portion of the accelerated air is directed through a bypass flow passage 56, which is provided between nacelle assembly 34 and engine case 38 and conducts this airflow over and around engine case 38. The remaining portion of air exhausted from intake fan 32 is directed into compressor section 36 and compressed by compressor 36 to raise the temperature and pressure of the core airflow. The hot, compressed airflow is supplied to combustion section 26 wherein the air is mixed with fuel and combusted utilizing one or more combustors 58 included within section 26. The combustive gasses expand rapidly and flow through turbine section 28 to drive the rotation of HP turbine 40 and LP turbine 42. Turbine nozzle 20 further accelerates the combustive gas flow and helps to impart the gas flow with a desired tangential component prior to impingement upon the rotating blades of HP turbine 40. The rotation of turbines 40 and 42 drives the rotation of shafts 44 and 46, respectively, which, in turn, drives the rotation of compressor 36 and intake fan 32. The rotation of shafts 44 and 46 also provides significant power output, which may be utilized in a variety of different manners, depending upon whether GTE 18 assumes the form of a turbofan, turboprop, turboshaft, turbojet engine, or an auxiliary power unit, to list but a few examples. After flowing through turbine section 28, the combustive gas flow is then directed into exhaust section 30 wherein mixer 54 mixes the combustive gas flow with the cooler bypass air received from bypass flow passages 56. Finally, the combustive gas flow is exhausted from GTE 18 through propulsion nozzle 50 to produce forward thrust, although this may not be the case in alternative embodiments wherein GTE 18 assumes the form of, for example, a turboshaft engine.

Figure 2:
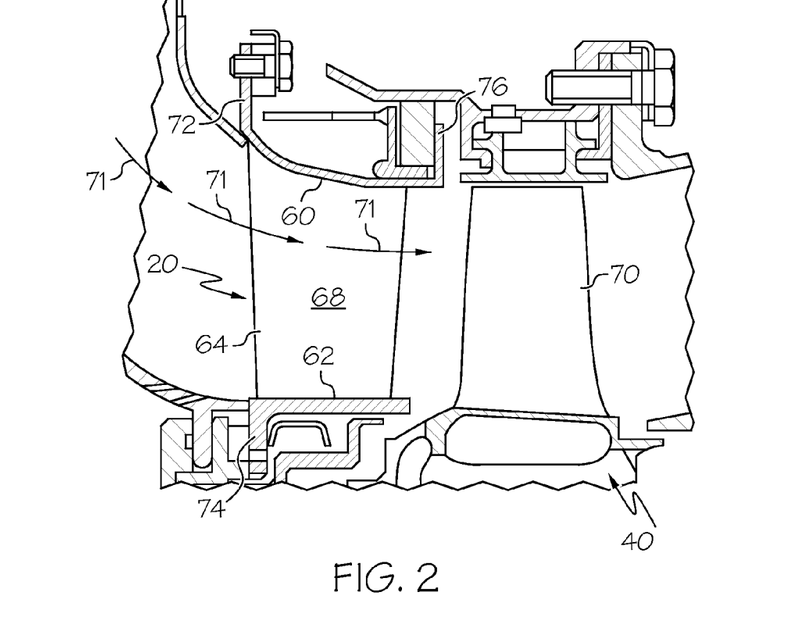
FIG. 2 is a more detailed cross-sectional view of a portion of the turbine nozzle and a portion of the high pressure turbine rotor included in the gas turbine engine shown in FIG. 1, as illustrated in accordance with an exemplary embodiment.

FIG. 2 is a more detailed cross-sectional view of a portion of turbine nozzle 20 and HP turbine 40, as illustrated in accordance with an exemplary embodiment. As can be seen in FIG. 2, turbine nozzle 20 includes an outer shroud or ring 60, an inner shroud or ring 62, and a plurality of airfoils or vanes 64 (only one of which can be seen in FIG. 2). Rings 60 and 62 are each annular structures, which extend around the rotational axis of GTE 18. Outer ring 60 circumscribes and is substantially concentric with inner ring 62. Nozzle vanes 64 extend radially between outer ring 60 and inner ring 62 to define a number of combustive gas flow paths 68 through the body of turbine nozzle 20. Each gas flow path 68 is defined by a different pair of adjacent or neighboring vanes 64; an inner surface of outer ring 60 located between the neighboring vanes 64, as taken in a radial direction; and an interior surface region of inner ring 62 located between the neighboring vanes 64, as taken in a radial direction. Gas flow paths 68 extend through turbine nozzle 20 in axial and tangential directions to guide combustive gas flow through the body of nozzle 20, while turning the gas flow toward the blades of HP turbine rotor 40 (one of which is shown in FIG. 2 and identified by reference numeral "70"). Gas flow paths 68 constrict or decrease in cross-sectional flow area when moving in a fore-aft direction along which combustive gas flows during engine operation (represented in FIG. 2 by arrows 71). Each flow path 68 thus serves as a convergent nozzle to meter and accelerate combustive gas flow through turbine nozzle 20 in the above-described manner. Turbine nozzle 20 may be fabricated to include any number of flanges or other structural elements to facilitate mounting and piloting to the static infrastructure of GTE 18; e.g., as shown in FIG. 2, and provided solely by way of example, turbine nozzle 20 may be fabricated to include a first leading flange 72 extending radially outward from the forward circumferential edge of outer ring 60, a second leading flange 74 extending radially inward from the forward circumferential edge of inner ring 62, and a trailing flange 76 extending radially outward from the aft circumferential edge of outer ring 60.

Figure 3:
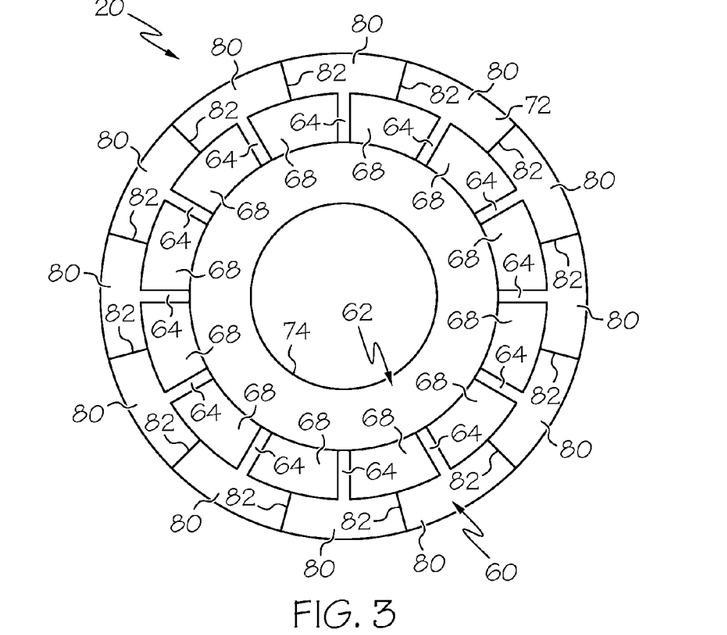
FIGS. 3 and 4 are front and front cross-sectional views, respectively, of the exemplary turbine nozzle shown in FIGS. 1 and 2.
Figure 4:
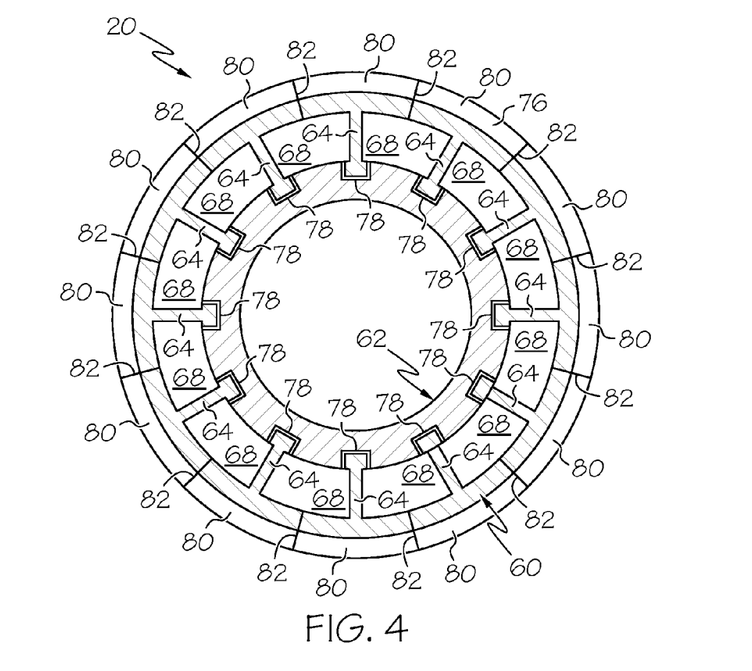

FIGS. 3 and 4 are simplified front and cross-sectional views, respectively, of turbine nozzle 20. These figures are provided to more clearly illustrate one possible construction of turbine nozzle 20 wherein outer ring 60 is produced by inter-bonding a number of arched segments 80 arranged in an annular formation or grouping, as described below in conjunction with FIGS. 5-8; and wherein inner ring 62 is fabricated to include a number of circumferentially-spaced cavities, depressions, or slots 78 (shown in FIG. 4), which receive the inner terminal ends of vanes 64 and cooperate therewith to produce a number of radial slip joints, as described below conjunction with FIGS. 9-12. The construction shown in FIGS. 3 and 4 and described below is provided by way of non-limiting example only; it is emphasized that turbine nozzle 20 can be produced utilizing any fabrication technique suitable for forming a plurality of radial slip joints extending around vanes 64 and/or containing a braze wick material impregnated by a braze material, as described below. For example, in other embodiments, inner ring 62 can be produced via the inter-bonding of a number of arched segments, and outer ring 60 can be fabricated to include a number of angularly-spaced slots that cooperate with the outer terminals ends of vanes 64 to form slip joints of the type described below. As a further example, rings 60 and 62 may each be cast as a complete ring and formed (e.g., cast or machined) to include a plurality of circumferentially-spaced openings through which separately-cast vanes 64 are inserted and then affixed (e.g., bonded) to either outer ring 60 or inner ring 62 during fabrication of turbine nozzle 20, with the non-fixed or floating terminal ends of vanes 64 forming slip joints with the ring to which the vanes are not affixed.

The ring or annular endwall to which turbine nozzle vanes 64 are affixed may be referred to herein as the "support ring," while the slotted ring or annular endwall forming radial slip joints with vanes 64 may be referred to herein as the "slip joint ring." In keeping with this terminology, the following description of the exemplary turbine nozzle 20 shown in FIGS. 3 and 4 will refer to outer ring 60 as "outer support ring 60" or, more simply, "support ring 60"; and to inner ring 62 as "inner slip joint ring 62" or, more simply, "slip joint ring 62." However, as explained in the foregoing paragraph, embodiments of turbine nozzle 20 can be fabricated wherein turbine nozzle vanes 64 are affixed to (e.g., integrally formed with or bonded to) the inner ring and form radial slip joints with the outer ring. In such embodiments, the inner ring would be considered the "support ring," while the outer ring would be considered the "slip joint ring."

In the illustrated embodiment shown in FIGS. 3 and 4, outer support ring 60 is produced via the inter-bonding of a number of arched ring segments 80. Each arched ring segment 80 is preferably, although not necessarily, integrally formed with a different vane 64 as a single cast piece 64, 80 (referred to below as "vane/ring pieces 64, 80"). In the illustrated example wherein twelve ring segments 80 are inter-bonded to produce outer support ring 60, each ring segment 80 spans an arc of 30 degrees; however, the number of rings segments and the geometry thereof will inevitably vary amongst different embodiments. Arched ring segments 80 are joined along bond lines 82, which are each preferably located between a different pair of neighboring vanes 64, as taken in a radial direction, to reduce thermomechanical stress applied to the bond joint during operation of turbine nozzle 20. In alternative embodiments, ring segments 80 may be joined together utilizing bolts or other mechanical fasteners rather than through bonding. This notwithstanding, ring segments 80 are preferably inter-bonded to minimize leakage paths through turbine nozzle 20, to reduce weight and part count, and to simplify installation within GTE 18. Ring segments 80 can be fabricated in any suitable manner, such as by forging and machining; it is, however, preferred that ring segments 80 are produced utilizing a casting process and will consequently be described as cast hereafter.

Figure 5:
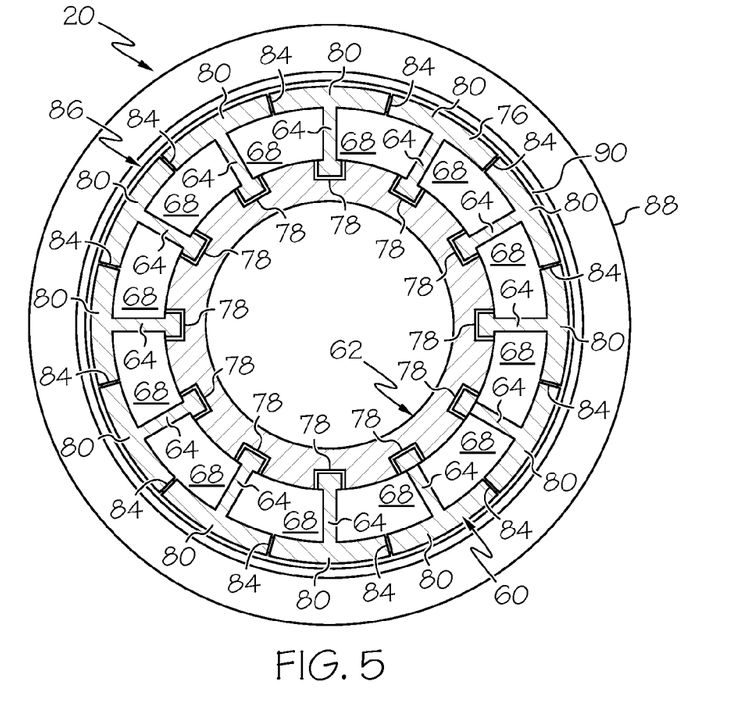
FIGS. 5-8 are front views of a thermal growth constrain ring positioned around the turbine nozzle (partially shown), which is illustrated in cross-section at various stages of manufacture during metallurgical consolidation of multiple arched pieces into a support ring (the outer ring, in the illustrated example) utilizing a directed thermal growth bonding process.

Vane/ring pieces 64, 80 can be joined together utilizing a metallurgical consolidation or bonding process capable of producing a monolithic, annular structure comprised of outer support ring 60 and turbine nozzle vanes 64, which extend radially inward from ring 60. In one embodiment, a thermal growth differential process is utilized to inter-bond vane/ring pieces 64, 80. In such a process, and with reference to FIG. 5, vane/ring pieces 64, 80 are first arranged in an annular grouping or ring formation 86 with the inner terminal ends of vanes 64 extending into their corresponding slots 78 provided in inner slip joint ring 62. When vane/ring pieces 64, 80 are arranged in this manner, each arched ring segment 80 is positioned between two neighboring segments 80. As indicated in FIG. 5, bonding material 84 may be disposed between the mating or contacting surfaces of each neighboring pair of ring segments 80. In one implementation, bonding material 84 is a strip or sheet of braze foil, and the bonding surfaces of neighboring segments 80 are formed to include a braze foil pocket (not shown). In this case, it is preferred that volume of each braze foil sheet is slightly greater than the volume of its corresponding pocket to ensure the creation of a metallurgically sound braze joint during the below-described directed thermal growth bonding process; e.g., the braze foil sheet may be trimmed to have a height and width substantially equivalent to the dimensions of braze foil pockets, while the thickness of the braze foil sheet may be chosen to be slightly greater than the pocket depth. Additionally or alternatively, bonding material 84 may comprise a braze paste applied in sufficient quantity to create a metallurgically sound braze joint. The foregoing notwithstanding, bonding material 84 need not be applied between arched ring segments 80 in all embodiments and, instead, metallurgical consolidation of segments 80 may be achieved solely through diffusion bonding.

After vane/ring pieces 64, 80 are arranged in ring formation 86 (FIG. 5), the directed thermal growth bonding process is carried-out. During the directed thermal growth bonding process, ring formation 86 is heated to a predetermined bonding temperature or temperatures while the outward radial growth of ring formation 86 is constrained. Convergent growth of the neighboring bonding surfaces of arched ring segments 80 thus occurs to promote the formation of a strong metallurgical bond. Specialized tooling is utilized to constrain or physically impede the outward radial growth of ring formation 86 during this process. As generically illustrated in FIG. 5, the directed thermal growth tool may include at least one thermal growth constraint ring 88, which is positioned around the circumference of ring formation 86. Thermal growth constraint ring 88 circumscribes the ring-shaped grouping formed by arched ring segments 80 and has an axial thickness sufficient to permit insertion between leading and trailing flanges 72 and 76 of turbine nozzle 20 (shown in FIG. 2). In addition to thermal growth constrain ring 88, the directed thermal growth tool may also include other structural components that are not shown in FIG. 5 for clarity, such as a fixture for retaining inner slip joint ring 62 in position. Additional description of a directed thermal growth tool adaptable for usage during the below-described inter-bonding process can be found in U.S. application Ser. No. 13/444,070, entitled "AXIALLY-SPLIT RADIAL TURBINES AND METHODS FOR THE MANUFACTURER THEREOF," and filed Apr. 11, 2012, which is assigned to the assignee of the instant application and which is incorporated by reference.

As indicated above, thermal growth constraint ring 88 is shaped and sized to extend around the circumference of ring formation 86 when loaded into the thermal growth constraint tool; e.g., the inner diameter of the central opening provided in ring 88 may be fabricated to be slightly larger than the outer diameter of ring formation 86. Thermal growth constraint ring 88 is fabricated to grow in a radially outward direction at a rate significantly slower than does ring formation 86 during thermal processing. To this end, constraint ring 88 may be fabricated from a refractory material having a coefficient of thermal expansion ("CTE") less than that of ring formation 86 and, preferably, less than approximately one half the CTE of the material from which vane/ring pieces 64, 80 are cast or otherwise fabricated. It is also desirable for thermal growth constraint ring 88 to have a sufficiently high temperature strength to constrain the outward radial growth of ring formation 86 in the below described manner. Considering this, it is preferred that thermal growth constraint ring 88 is formed from a metallic material (i.e., a non-ceramic metal or superalloy) having a relatively low CTE, such as molybdenum or rhenium. In one embodiment, thermal growth constraint ring 88 comprises an annular body fabricated from molybdenum.

In certain embodiments, and as further illustrated in FIG. 5, at least one sacrificial crush ring 90 may be disposed between the outer circumference of ring formation 86 and the inner circumference of thermal growth constraint ring 88. When provided, crush ring 90 is conveniently fabricated from a material that softens and plastically deforms during thermal processing. The material from which crush ring 90 is fabricated can thus flow or deform to accommodate misalignment between vane/ring pieces 64, 80 and geometric imperfections in the outer circumferential surface of ring formation 86 and the inner circumferential surface of constraint ring 88 and thereby help ensure that a substantially uniform load is applied to ring formation 86 during thermal bonding. In addition to softening at thermal processing temperatures, the parent material of crush ring 90 also preferably has a CTE similar to the material from which vane/ring pieces 64, 80 are fabricated to allow crush ring 90 to grow radially outward in conjunction with ring formation 86. Finally, it also desirable for the crush ring material to be relatively low cost in view of the consumable or sacrificial nature of crush ring 90. In one implementation, crush ring 90 is fabricated from a low carbon or other low superalloy steel, such as an AISI 1010 or 1020 steel.

Figure 6:
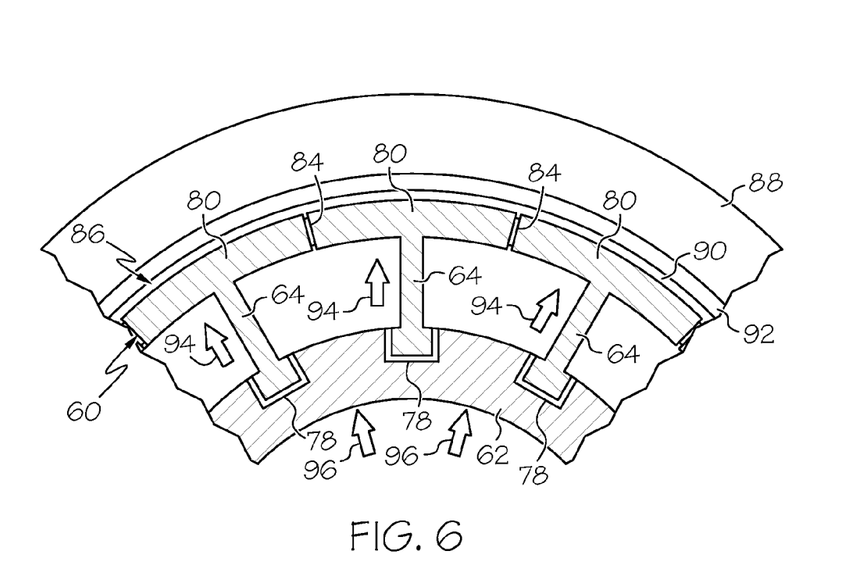
Figure 7:
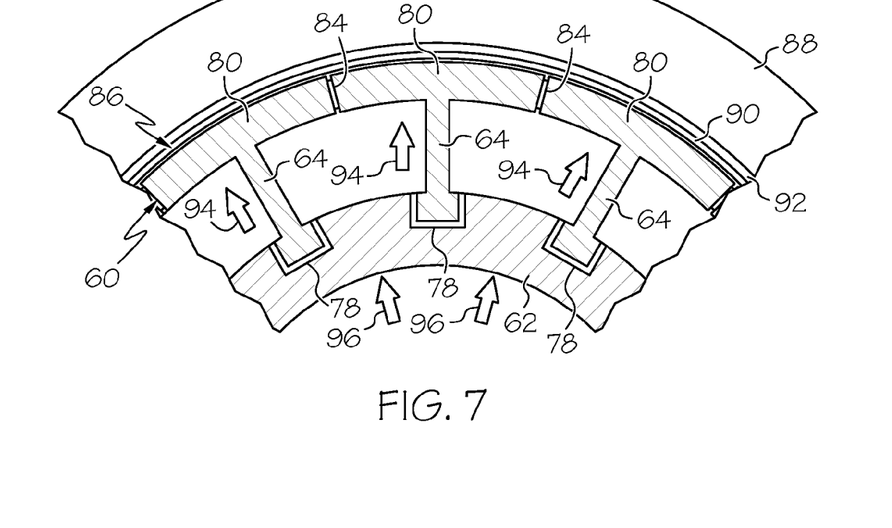
Figure 8:
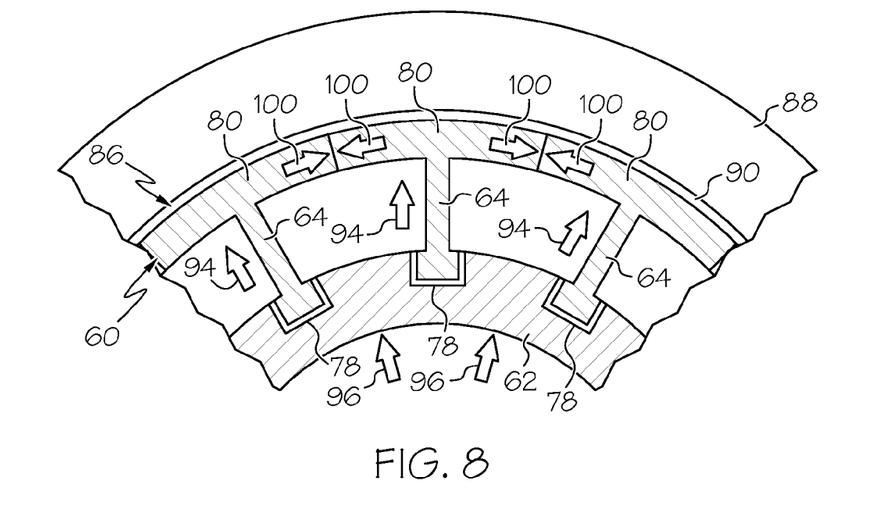

FIGS. 6-8 generically illustrate the manner in which thermal growth constraint ring 88 impedes the outward radial growth of ring formation 86 during the directed thermal growth bonding process. Referring initially to FIG. 6, which is a detailed view of a portion of ring formation 86, thermal growth constrain ring 88, and sacrificial crush ring 90, the outer circumferential surface of crush ring 90 may be separated from the inner circumferential surface of constraint ring 88 by a relatively small radial gap 92 prior to heating. As ring formation 86 and the thermal growth constraint tool are heated to the desired bonding temperature, ring formation 86 grows in a radially outward direction such that the outer circumference of formation 86 gradually increases (indicated in FIGS. 6 and 7 by arrows 94). Inner slip joint ring 62 likewise grows in a radially outward direction in conjunction with ring formation 86 (represented in FIGS. 6-8 by arrows 96). Furthermore, in embodiments wherein crush ring 90 is formed from a material having a CTE similar or identical to that of ring formation 86, crush ring 90 also grows radially outward at a rate similar ring formation 86. Thermal growth constraint ring 88 grows radially outward more gradually than does ring formation 86 and crush ring 90; consequently, radial gap 92 eventually closes and crush ring 90 comes into contact with constraint ring 88. This may be more fully appreciated by comparing FIG. 6 to FIG. 7 wherein gap 92 is shown in a partially closed state, and further comparing FIG. 6 to FIG. 8 wherein gap 92 has been fully closed as the outer circumferential surface of sacrificial crush ring 90 and the inner circumferential surface of thermal growth constrain ring 88 have come into contact.

As gap 92 closes and crush ring 90 comes into contact with thermal growth constraint ring 88, further outward radial growth of ring formation 86 is impeded or physically obstructed by constraint ring 88. Further growth of ring formation 86 consequently results in the application of a significant convergent pressure urging arched ring segments 80 together (represented in FIG. 8 by arrows 100). A strong metallurgical bond is formed between adjoining bonding surfaces of arched ring segments 80 as a result of this combination of high temperatures and high convergent pressures. When bonding material 84 is present (shown in FIGS. 5-7), the bonding temperature or temperatures to which ring formation 86 and the thermal growth constraint tool are heated during the directed thermal growth process will typically be selected to exceed the melt point of braze superalloy material, while being less than the melt point of the other components included within ring formation 86. Conversely, in embodiments wherein a braze foil or other bonding material is not utilized, the bonding temperatures and components dimensions are selected to create sufficient convergent pressures to ensure the creation of a diffusion bond between neighboring ring segments 80. In many cases, both a braze joint and a diffusion bond may be created between arched ring segments 80 during the above-described directed thermal growth bonding process. By way of non-limiting example, ring formation 86 and the thermal growth constraint tool may be heated to temperature approaching or exceeding about 2150° Fahrenheit during the above-described bonding process.

By initially casting a number of small volume vane/ring pieces 64, 80, which are then joined to produce outer support ring 60 and turbine nozzle vanes 64 in the above-described manner, casting yields can be improved relative to the casting of an entire turbine nozzle ring, which is more prone to voiding and other defects that can increase scrap. The casting of such small-volume pieces also allows turbine nozzle vanes 64 to be imparted with more complex internal geometries and cooling flow passages. As a further advantage, the above-described fabrication method enables vane/ring piece 64, 80, and therefore turbine nozzle vanes 64, to be cast from a single crystal superalloy having its crystallographic grain structure oriented to provide optimal mechanical strength in a radial direction for its corresponding vane 64. By way of non-limiting example, an oxidation-resistant, single crystal, nickel-based superalloy may be utilized, such as the nickel-based superalloy commercially identified as "CMSX 4" or the nickel-based superalloy commercially identified as "SC180." Of course, various other high temperature materials may also be utilized in the fabrication of vane/ring pieces 64, 80, including equiaxed superalloys. As a still further advantage, the above-described manufacturing technique enables the formation of coating systems, such as thermal barrier systems and/or bond coats, over vane/ring pieces 64, 80 and/or inner ring 62 prior to turbine nozzle assembly. For example, application of the coating or coating system prior to assembly of the turbine nozzle may help to ensure a more uniform coating coverage over the coated component surfaces in embodiments wherein a vapor deposition process, such as electron beam physical vapor deposition, is utilized to form the coating or coating system over vane/ring pieces 64 and/or over inner ring 62.

Turbine nozzle vanes 64 need not be integrally formed with ring segments 80 in all embodiments. Instead, outer support ring 60 may cast or machined to include a number of circumferentially-spaced openings extending radially therethrough. Vanes 64 may be separately cast, inserted through these radial openings, and then affixed to outer support ring 64 by, for example, bonding during fabrication of turbine nozzle 20. In this case, outer support ring 60 can be produced as a single casting or via the metallurgical consolidation of a number of individually-cast arched pieces, as previously described. Notably, such a fabrication technique still permits each vane 64 to be cast from a single crystal alloy. Additionally, such a fabrication technique also permits outer support ring 64 to be formed from a different alloy than are vanes 64 to allow greater flexibility in the choice of materials from which turbine nozzle 20 is fabricated for cost savings, weight savings, or for better tailoring different regions of nozzle 20 to the disparate operating conditions experienced thereby. However, as a disadvantage, such a fabrication technique will typically entail the formation of bond lines or joints in areas of the turbine nozzle subject to greater thermomechanical stress during engine operation as compared to bond lines 82 shown in FIGS. 3 and 4.

With continued reference to the exemplary embodiment shown in FIGS. 3-8, inner slip joint ring 62 is conveniently produced as a single or unitary piece utilizing, for example, a single shot casting process. Circumferentially-spaced slots 78 (FIGS. 4-8) can be features defined by the casting tool or, instead, may be created by subsequent machining. The term "slot," as appearing herein, denotes any penetrating or non-penetrating opening, depression, or cavity formed in a slip joint ring that can cooperate with a turbine nozzle vane to form a slip joint of the type described herein. The slots will often assume the form of depressions having a planform shape conformal with that of the airfoil extensions and having an angular spacing corresponding to that of the turbine nozzle vanes. The slots may be formed in or through the inner circumferential surface of the slip joint ring when the slip joint ring is the outermost ring of the turbine nozzle. Conversely, the slots may be formed in or through the outer circumferential surface of the slip joint ring when the slip joint ring is the innermost ring of the turbine nozzle. Further description of circumferentially-spaced slots 78 is provided below in conjunction with FIGS. 9 and 10.

Figure 9:
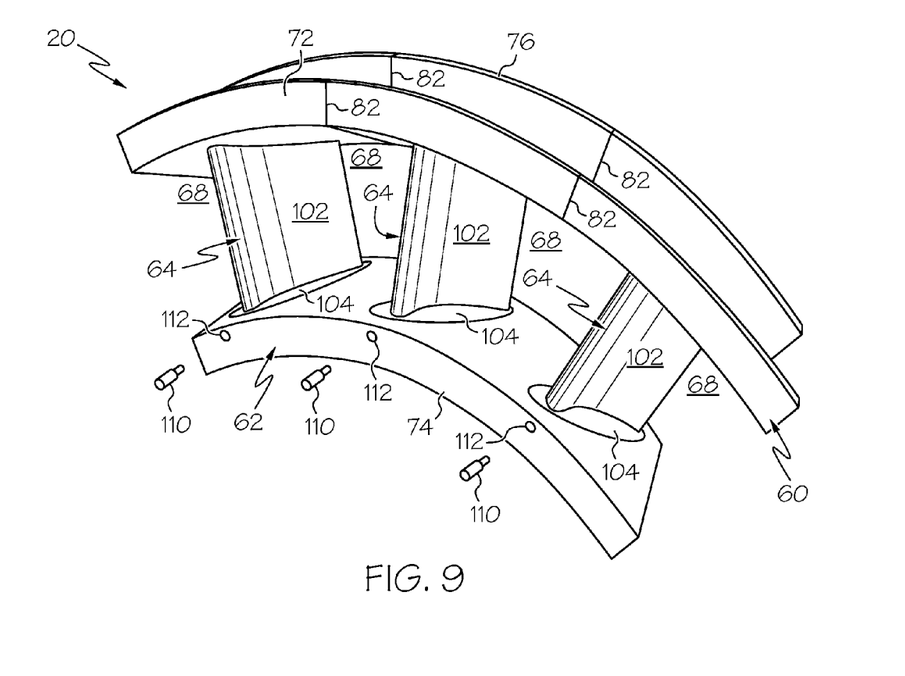
FIGS. 9 and 10 are cutaway and cross-sectional views, respectively, of a portion of the turbine nozzle shown in FIGS. 1-4 illustrating the slip joints of the turbine nozzle in greater detail, as shown in accordance with an exemplary and non-limiting embodiment.
Figure 10:
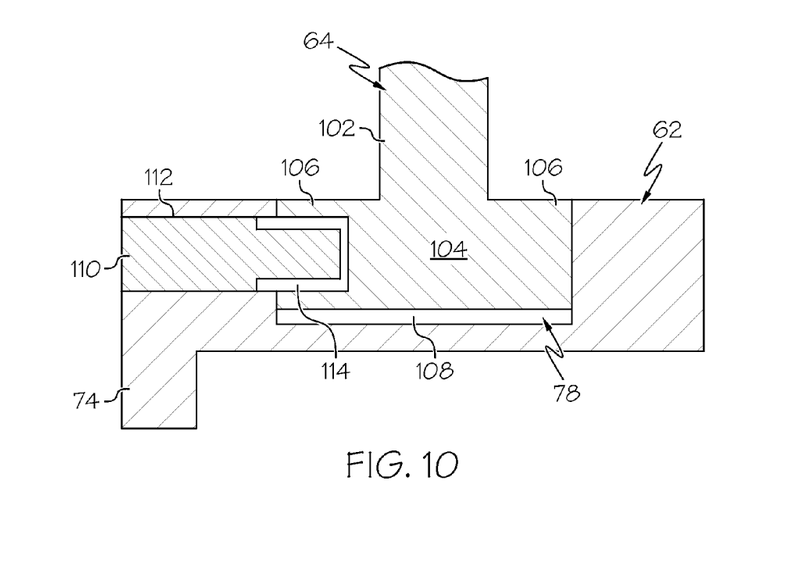

FIGS. 9 and 10 are cutaway and cross-sectional views, respectively, of a portion of the turbine nozzle 20 illustrating in greater detail the turbine nozzle radial slip joints, which are formed between circumferentially-spaced slots 78 and the mating terminal end portions of vanes 64. As identified in FIGS. 9 and 10, each turbine nozzle vane 64 can be divided into two general regions or portions, namely, a main airfoil portion 102 and an airfoil extension 104. Main airfoil portion 102 extends between rings 60 and 62 and has a cross-sectional airfoil shape, which conditions combustive gas flow during engine operation in the conventional manner. By comparison, each airfoil extension 104 is matingly received by one of slots 78 provided in slip joint ring 62 and will typically be largely, if not wholly, contained within slip joint ring 62. The outer exposed surface of airfoil extension 104 may be contoured to form a smooth, substantially uninterrupted flow path with inner slip joint ring 62. A first end of main airfoil portion 102 is fixedly attached to (e.g., bonded to or integrally formed with) support ring 60; i.e., in the illustrated example wherein support ring 60 is the outermost ring, the radially-outer end of main airfoil portion 102 is joined to support ring 60. The opposing end of main airfoil portion 102 (the radially-inner end of main airfoil portion 102 in FIGS. 9 and 10) is fixedly joined to airfoil extension 104. Main airfoil portion 102 and airfoil extension 104 are preferably integrally formed as a single cast piece; however, this need not always be the case.

Main airfoil portion 102 and airfoil extension 104 may have similar circumferential profiles or planform shapes. It is, however, preferred that airfoil extension 104 has an enlarged and gradually contoured circumferential profile, as compared to main airfoil portion 102, to lower tolerances and to allow a mating or conformal fit, and therefore a more uniform gap width, to be more easily created between airfoil portion 102 and the surrounding sidewalls defining each slot 78. For this reason, and as shown most clearly in FIG. 9, each airfoil extension 104 may be imparted with a substantially elliptical or ovular circumferential profile; and each slot 78 may likewise be formed to have a substantially elliptical or ovular circumferential profile. Such a gradually contoured surface and substantially uniform gap width also facilitates the deposition of sealing material into the slip joint to deter the inflow of combustive gasses into slots 78 during operation of turbine nozzle 20, as described more fully below in conjunction with FIGS. 11 and 12. As identified FIG. 10, the outer circumferential surface of airfoil extension 104 and the inner circumferential surface defining slot 78 create a relatively small clearance at the circumferential interface 106 between the turbine nozzle vane 64 and slip joint ring 62. By comparison, a relatively large radial gap 108 is provided between the terminal end surface of airfoil extension 104 (i.e., the radially-inner end of airfoil extension 104 in the illustrated example) and the floor of slot 78 to accommodate relative radial movement between the turbine nozzle vane 64 and slip joint ring 62.

If desired, turbine nozzle 20 may be equipped with a plurality of failsafe retaining members to prevent separation of airfoil extensions 104 from inner slip joint ring 62 in the unlikely event of airfoil burn-through. In the illustrated example shown in FIGS. 9 and 10, the failsafe retaining members assume the form of retention pins 110. During assembly of turbine nozzle 20, retention pins 110 are inserted into openings or axial bores 112 provided through the leading or forward annular face of inner slip joint ring 62. As shown most clearly in FIG. 10, a cavity, opening, or blind bore 114 is likewise provided in the leading of each airfoil extension 104, which aligns with its respective bore 112 when airfoil extension 104 is properly positioned within its slot 78. Each retention pin 110 extends from inner slip joint ring 62 into an airfoil extension 104 to provide the desired retention function preventing separation of vanes 64 from inner slip ring 62 should burn-through occur. A clearance is provided around the portion of the retention pin 110 that projects into airfoil extension 104, at least in radial directions, to prevent obstruction of the relative radial movement between turbine nozzle vane 64 and inner slip joint ring 62. For example, as indicated in FIGS. 9 and 10, dual diameter pins may be utilized such that a circumferential clearance is provided around the small diameter head of the pins, as received within bore 114 in airfoil extensions 104.

While airfoil extensions 104 and slots 78 can be produced to relatively tight tolerances such that the circumferential gap or clearance between each extension 104 and its respective slot 78 is relatively small, gas flow leakage into slots 78 can still occur. Such gas flow leakage reduces the efficiency of turbine nozzle 20 and can potentially cause structural degradation due to hot gas corrosion, oxidation, thermal fatigue, erosion, and the like. To minimize gas inflow into slots 78, the circumferential clearances between airfoil extensions 104 and surrounding slots 78 can be filled, in part or in whole, with one or more sealing materials. The sealing materials are preferably chosen to minimize or prevent interference with the sliding radial movement of the slip joints, to have a relatively high melt point to prevent melting or softening during operation of turbine nozzle 20, and to be reliably retained within the slips joints by, for example, formation of a relatively strong bond with either the inner peripheral surfaces of slots 78 or the outer peripheral surfaces of airfoil extensions 104. In certain embodiments, the selected sealing material or materials may initially be bonded to both the inner peripheral surfaces of slots 78 and the outer peripheral surfaces of airfoil extensions 104. However, in this case, a purposefully weak bond may be created between the sealing material and the inner peripheral surfaces of slots 78 or the outer peripheral surface of airfoil extensions 104 such that the sealing material separates therefrom during operation of the turbine nozzle 20 to allow slippage. Alternatively, the sealing material may be bonded to both the inner peripheral surfaces of slots 78 and the outer peripheral surface of airfoil extensions 104 and may fracture radially during usage to accommodate relative radial movement between airfoil extensions 104 and slip joint ring 62. Materials suitable for this purpose include, but are not limited to, ceramics and braze materials of the type described below.

Figure 11:
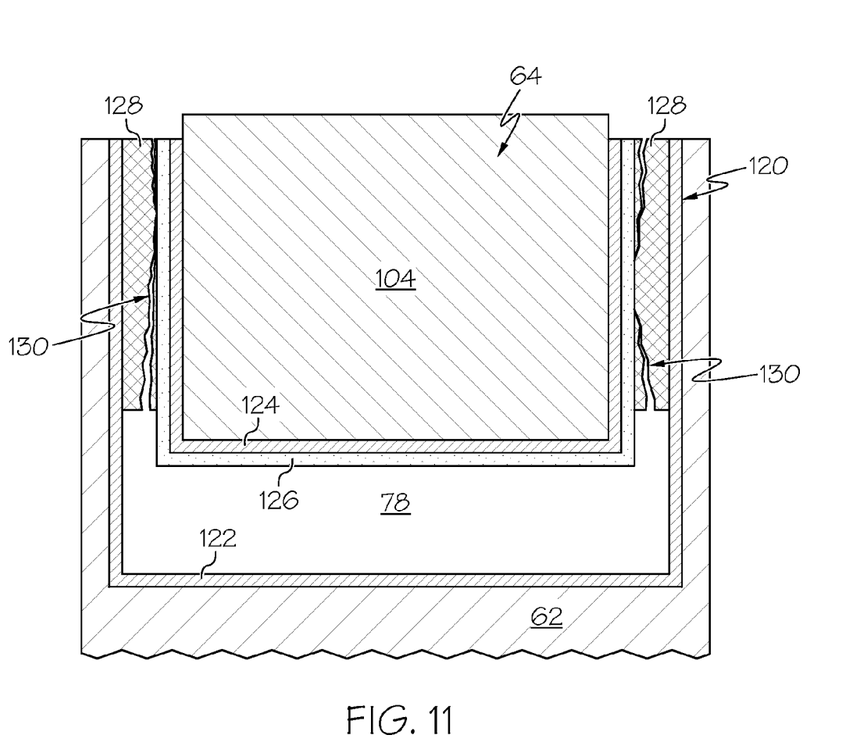
FIGS. 11 and 12 are simplified cross-sectional views illustrating two different manners in which the slip joints of the turbine nozzle may be sealed to prevent gas leakage utilizing one or more seal materials, such as a braze material.
Figure 12:
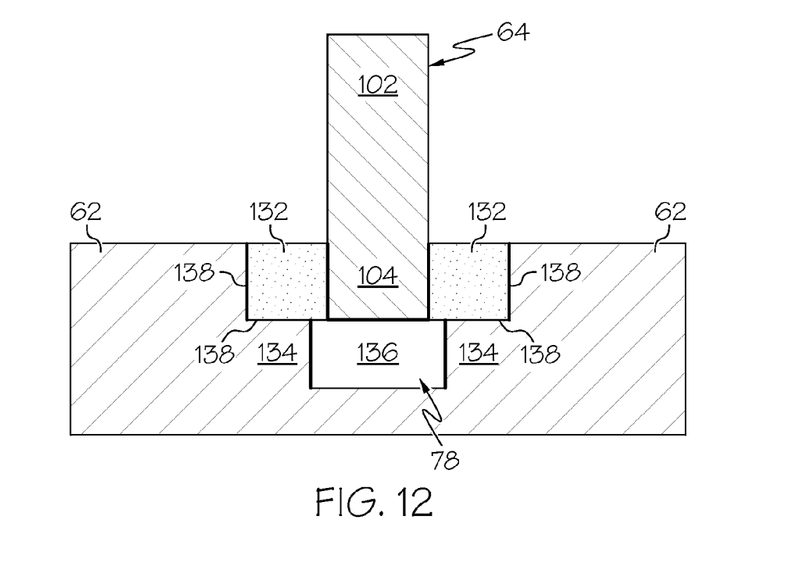

FIG. 11 is a cross-sectional view of one turbine nozzle vane 64 and its corresponding slot 78 illustrating a sealing material system 120, which may be formed within slot 78 to prevent or at least deter gas leakage into slot 78 during engine operation. In the illustrated example, sealing material system 120 includes the following layers: (i) a ring bond coat 122 formed over the inner surfaces of slot 78, (ii) an airfoil bond coat 124 formed over the outer surfaces of airfoil extension 104, (iii) a grit-blasted layer or a Thermally-Grown Oxide ("TGO") layer 126 formed over airfoil bond coat 124, and (iv) a braze layer 128 formed between layer 126 and ring bond coat 122. Braze layer 128 may be a nickel-based braze that forms an interface with layer 126 prone to fracture when subject to sheer forces. As a result of this weak braze joint, and as indicated in FIG. 11 at 130, cracks or fractures develop between braze layer 128 and layer 126 to accommodate the relative radial movement occurring between turbine nozzle vane 64 and inner slip joint ring 62 when the turbine nozzle is exposed to hot combustive gas flow. Further description of sealing material systems suitable for usage as sealing material system 120 can be found in U.S. Pat. No. 8,047,771 B2, entitled "TURBINE NOZZLES AND METHODS OF MANUFACTURING THE SAME," issued Nov. 1, 2011, which bears a common assignee with the instant application and which is hereby incorporated by reference. It is emphasized, however, that the sealing material slip joint created between each airfoil extension 104 and its corresponding slot 78 can be created utilizing any material or layers of materials that provide the desired sealing function, while allowing sliding radial movement between vanes 64 and inner slip joint ring 62; e.g., in certain embodiments, a weak braze joint may be created similar to that described above but lacking an oxide layer.

The above-described turbine nozzle manufacturing process advantageously allows bond coats 122 and 124 to be created over turbine nozzle vanes 64 and inner slip joint ring 62, respectively, prior to turbine nozzle assembly. Layer 126 can likewise be formed by deposition of a suitable material and subsequent grit blasting (in embodiments wherein layer 126 is a grit-blasted layer) or by heating in an oxidizing atmosphere (in embodiments wherein layer 126 is a TGO) prior to insertion of nozzle vanes 64 into their respective slots 78. A braze powder form may then be disposed within slots 78 around airfoil extensions 104 of turbine nozzle vanes 64 and subsequently subjected to thermal processing during which the braze powder melts, flows into the region between layer 126 and bond coat 122, and coalesces to form braze layer 128 upon cooling. In embodiments wherein a directed thermal growth bonding process is utilized to consolidate a number of ring segments to produce a monolithic ring, as described above in conjunction with FIGS. 6-8, process efficiency may be increased by melting the braze material during the high temperature metallurgical consolidation process described above.

It may not be possible to position ring-shaped turbine nozzle 20 (FIGS. 1-6) such that all slots 78 are upright at a given time during thermal process, and undesired outflow of the braze material can consequently occur. To prevent such outflow, a braze wick material or matrix (referred to herein simply as a "braze wick") may further be disposed within the slip joints to help draw-in and retain the liquefied braze material by capillary action during thermal processing. The braze wick may be, for example, pellets or shot composed of a superalloy material, such as the parent material of inner slip joint ring 62. As the nozzle is assembled on its side, the braze wick may be retained in place utilizing a binder material, such as a cellulose-based or other organic-based binder that thermally decomposes during high temperature thermal processing. This results in the creation of slip joints between turbine nozzle vanes 64 and slip joint ring 62 each including a braze wick material impregnated by a braze material (both generically represented in FIG. 11 by layer 128). In further embodiments, the braze wick may be a wire mesh. In such embodiments, the wire mesh may be obtained in sheet form, cut to an appropriate shape, press-fit into slots 78, and possibly tack welded in place prior to deposition of the braze powder and thermal processing.

In embodiments wherein the slip joints created between turbine nozzle vanes and slip joint ring 62 include a braze wick material, the circumferential clearances provided between airfoil extensions 104 and the inner peripheral surfaces of slots 78 can be increased to lower tolerances. This may be more fully appreciated by referring to FIG. 12 wherein a relatively large clearance is provided around an airfoil extension 104 and filled with a braze-impregnated braze wick 132. In this embodiment, slot 78 is further fabricated to include a circumferential shelf 134 over which the braze wick material is dispensed. Shelf 134 deters ingress of the braze wick material into the radial clearance 136 provided between the inner terminal end of airfoil extension 104 and the floor of slot 78 to accommodate relative movement between airfoil extension 104 and slip joint ring 62. The formation of a strong bond may be promoted along selected surfaces 138 by, for example, ensuring that these surfaces are free of contaminants prior to heat treatment and infiltration of the braze material into the braze wick. Conversely, a weak bond may intentionally be created along the other surfaces contacted by or potentially contacted by the braze material by, for example, contaminating these surfaces; e.g., grit blasting may be performed in an ambient environment to introduce oxide contaminants. In this manner, the braze material will tend to separate from airfoil extension 104 along these surfaces to create a braze slip joint allowing radial movement of turbine nozzle vane 64 relative to inner slip joint ring 62 in the above-described manner.

The foregoing has thus provided embodiments of a method for producing a turbine nozzle including slip joints that permit relative radial movement between the turbine nozzle vanes and at least one of the turbine nozzle rings or endwalls to alleviate thermomechanical stressors during operation of the turbine nozzle and exposure to hot combustive gas flow. In contrast to other known fabrication methods for producing turbine nozzles including slip joints, embodiments of the above-described fabrication method enable greater flexibility in vane geometry and enable the formation of slip joints relatively low tolerance, uniform gaps to minimize gas leakage and, in certain embodiments, to promote the formation of a consistent braze seal about the entire periphery of the slip joint. Embodiments of the above-described fabrication method further enable individual fabrication of the turbine nozzle vanes to enable more complex cast features, to lower scrap rates, and to enable the vanes to be fabricated from single crystal materials.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as setforth in the appended Claims.

What is claimed is:

1. A turbine nozzle, comprising:
a support ring;
a slip joint ring substantially concentric with the support ring and radially spaced apart therefrom, the slip joint ring having a plurality of circumferentially-spaced slots therein;
a plurality of vanes fixedly coupled to the support ring and extending radially therefrom into the plurality of circumferentially-spaced slots;
a plurality of radial slip joints formed between the plurality of vanes and the plurality of circumferentially-spaced slots, each slip joint extending around a different one of the plurality of vanes to permit relative radial movement between the plurality of vanes and the slip joint ring during operation of the turbine nozzle;
failsafe retention pins extending from the slip joint ring into the plurality of vanes; and
a plurality of openings provided in the plurality of vanes and into which the failsafe retention pins extend, the plurality of openings sized such that clearances are provided between the failsafe retention pins and the plurality of openings in at least radial directions permitting the failsafe retention pins to travel within the plurality of openings as relative radial movement occurs between the plurality of vanes and the slip joint ring.

2. The turbine nozzle of claim 1 wherein the support ring circumscribes the slip joint ring.

3. The turbine nozzle of claim 1 wherein each of the plurality of vane/ring pieces is cast from a single crystal alloy.

4. The turbine nozzle of claim 1 wherein the plurality of vanes each comprise:
an airfoil extension extending into and having a planform geometry substantially conformal with one of the plurality of slots; and
an airfoil portion having a first end joined to the airfoil extension and having a second, opposing end joined to the support ring.

5. The turbine nozzle of claim 4 wherein the airfoil extension and each of the plurality of slots has a generally ovular planform shape.

6. The turbine nozzle of claim 1 wherein the plurality of radial slip joints each further comprise a radial clearance formed between the terminal end of the vane extending into the slot and the bottom of the slot.

7. The turbine nozzle of claim 1 wherein the plurality of radial slip joints comprise braze material disposed within the plurality of circumferentially-spaced slots.

8. The turbine nozzle of claim 7 wherein the plurality of slips joints further comprise a braze wick material disposed within the plurality of circumferentially-spaced slots and infiltrated by the braze material.

9. The turbine nozzle of claim 8 wherein the braze wick is selected from the group consisting of shot and wire mesh.

10. A turbine nozzle, comprising:
   a support ring;
   a slip joint ring substantially concentric with the support ring and radially spaced apart therefrom, the slip joint ring having a plurality of slots therein;
   a plurality of vanes fixedly coupled to the support ring and extending radially therefrom toward the slip joint ring; and
   a plurality of radial slip joints formed between the plurality of vanes and the plurality of slots the plurality of radial slip joints each comprising:
      a braze wick disposed in one of the plurality of slots; and
      a braze material impregnated into the braze wick and bonded to at least one of the slip joint ring and a vane included within the plurality of vanes;
   wherein the plurality of slots each comprise a slot floor and a circumferential shelf, which extends from the slot floor to support the braze wick and which surrounds a radial clearance between the slot floor and a terminal end of one of the plurality of vanes.

11. The turbine nozzle of claim 10 wherein the braze wick is selected from the group consisting of shot and wire mesh.

12. A method for producing a turbine nozzle, comprising:
   obtaining a plurality of vane/ring pieces;
   arranging the plurality of vane/ring pieces in a ring formation around a slip joint ring having circumferential surface in which a plurality of slots is formed;
   after arranging the plurality of vane/ring pieces in the ring formation, inter-bonding the plurality of vane/ring pieces to yield a support ring from which a plurality of vanes extends;
   wherein the plurality of vane/ring pieces are arranged around the slip joint ring and inter-bonded, the plurality of vanes and the plurality of slots combine to form a plurality of radial slip joints permitting relative radial movement between the plurality of vanes and the slip joint ring during operation of the turbine nozzle; and
   wherein the method further comprises inserting failsafe retention members into the slip joint ring and extending into openings formed in the plurality of vanes, while providing clearances between the failsafe retention members and the openings in at least radial directions to permit the failsafe retention members to travel within openings as relative radial movement occurs between the plurality of vanes and the slip joint ring.

13. The method of claim 12 further comprising disposing a sealing material in the slip joints deterring inflow of combustive gasses during operation of the turbine nozzle.

14. The method of claim 12 further comprising:
   after bonding the plurality of vane/ring pieces, disposing a braze wick material in the plurality of radial slip joints; and
   after disposing the braze wick material in the plurality of radial slip joints, infiltrating the braze wick material with a liquefied braze material drawn into the radial slip joints at least partly by capillary action with braze wick material.

15. The method of claim 14 wherein the slip joint ring comprises circumferential shelves located within the plurality of slots, and wherein disposing comprises positioning the braze wick material over the circumferential shelves in the plurality of radial slip joints.

16. The method of claim 10 wherein inter-bonding comprises inter-bonding the plurality of vane/ring pieces utilizing a directed thermal growth bonding process after arranging the plurality of vane/ring pieces in a ring formation around the slip joint ring.

* * * * *